(12) United States Patent
Kloos

(10) Patent No.: US 8,807,809 B2
(45) Date of Patent: Aug. 19, 2014

(54) LIGHTING DEVICE

(71) Applicant: HELLA KGaA, Lippstadt (DE)

(72) Inventor: Gerhard Kloos, Erwitte (DE)

(73) Assignee: Hella KGaA, Lippstadt (DE)

( * ) Notice: Subject to any disclaimer, the term of this patent is extended or adjusted under 35 U.S.C. 154(b) by 0 days.

(21) Appl. No.: 13/646,288

(22) Filed: Oct. 5, 2012

(65) Prior Publication Data

US 2013/0155712 A1  Jun. 20, 2013

(30) Foreign Application Priority Data

Oct. 6, 2011  (DE) .......................... 10 2011 054 234

(51) Int. Cl.
*F21V 5/00* (2006.01)

(52) U.S. Cl.
USPC ........... 362/521; 362/235; 362/244; 362/331; 362/520; 362/543

(58) Field of Classification Search
USPC ............ 362/227, 235, 244, 311.01, 326, 509, 362/520, 521, 543, 331
See application file for complete search history.

(56) References Cited

U.S. PATENT DOCUMENTS

2013/0208493 A1* 8/2013 Kloos .......................... 362/521

* cited by examiner

*Primary Examiner* — Meghan Dunwiddie
(74) *Attorney, Agent, or Firm* — Husch Blackwell LLP; H. Frederick Rusche; Daniel S. Cohn

(57) ABSTRACT

A lighting device for vehicles with a plurality of light sources arranged like a matrix in a light generation level, with a light forming optic unit arranged in front of the light sources in a primary direction of emission, and with another optic unit arranged between the light forming optic unit and the light sources, comprising a plurality of optic elements, with the optic elements being arranged like a matrix and one optic element each being allocated to a light source, with the additional optic unit being embodied as a widening optic unit with a plurality of band reflector segments arranged intersecting to form polygonal reflectors as optic elements and with a plurality of light forming elements, which are arranged like a matrix corresponding to the light sources and arranged between the light sources and the polygonal reflectors.

11 Claims, 3 Drawing Sheets

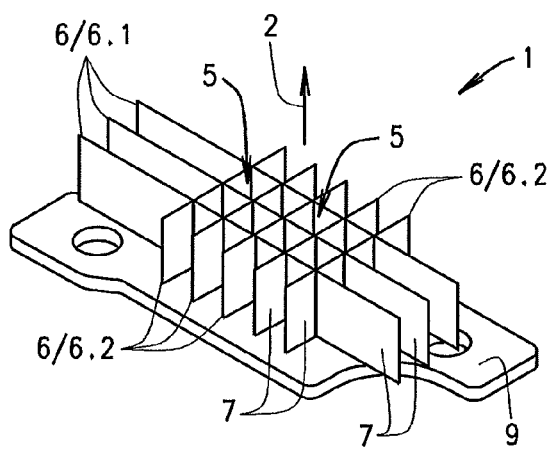
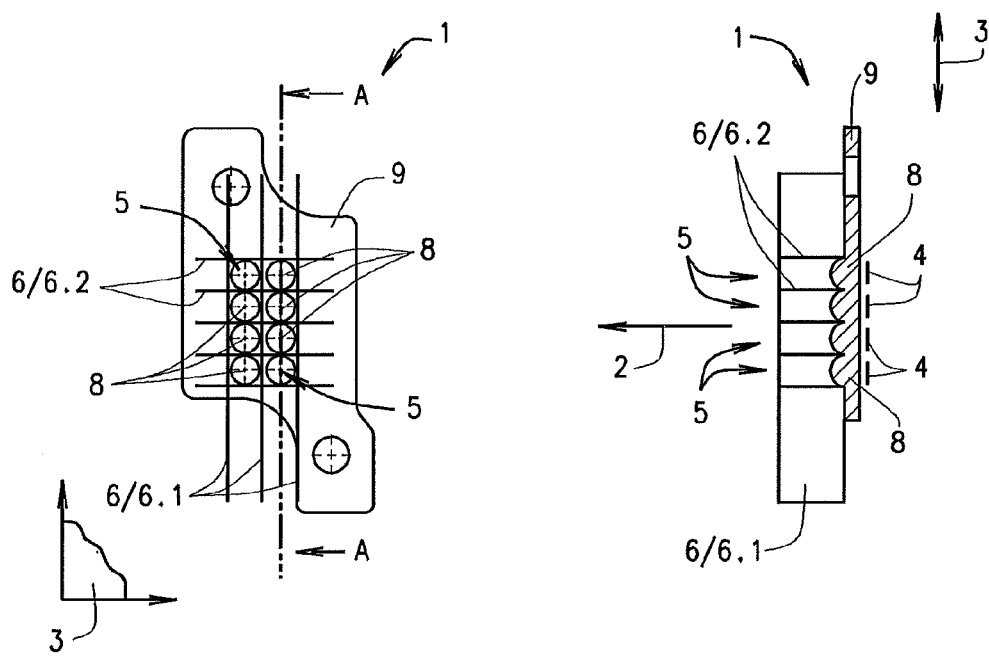

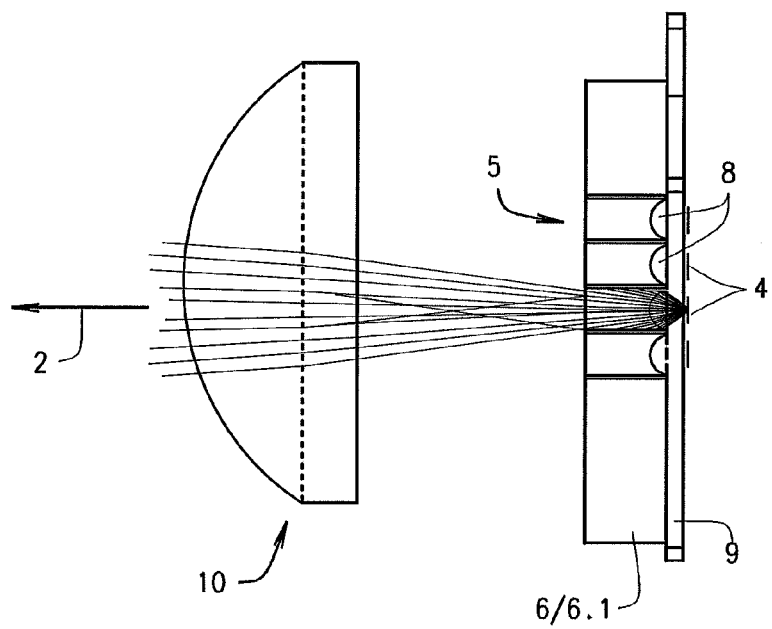
FIG. 4
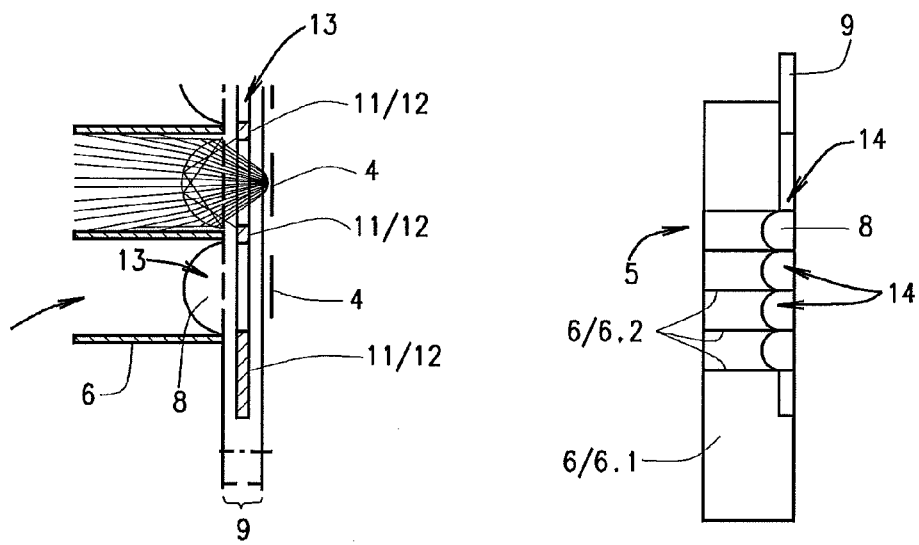
FIG. 5
FIG. 6

LIGHTING DEVICE

CROSS REFERENCE

This application claims priority to German Patent Application No. 10 2011 054 234.5, filed Oct. 6, 2011.

TECHNICAL FIELD OF THE INVENTION

The invention relates to a lighting device for vehicles with a plurality of light sources arranged like a matrix in a light generation level, with a light forming optic unit arranged in front of the light sources seen in the primary direction of emission and with an additional optic unit arranged between the light forming optic unit and the light sources comprising a plurality of optic elements, with the optic elements being arranged like a matrix and one optic element each being allocated to a light source.

BACKGROUND OF THE INVENTION

In the automotive industry it is increasingly desired to provide controllable and/or dynamic light distribution using lighting devices. For example, certain areas of the high beam function shall be dimmed when a vehicle is driving ahead in the light [cone] distributed or a pedestrian walks into it. In order to realize such controlled light distributions the lighting devices installed increasingly comprise a plurality of individually controlled light sources, particularly light diodes. The partial light beams emitted by the individual light sources are combined in a subsequent light forming optic unit and shaped such that the desired light distribution is provided. Here it is problematic that for example light sources arranged like a matrix show a lateral distance from each other not optimal according to aspects of lighting technology. Lighting devices with a plurality of individual light diodes in the SMD design sometimes show excessive lateral distances of the light sources. In this case light spots (light gaps), i.e. sections not or insufficiently lit, which are disturbing and should be avoided for safety reasons, may form in the light distribution.

In order to achieve homogenous light distribution even in disadvantageously distanced light sources and thus avoid light spots the partial light beams emitted by the individual light sources are widened in proximity to the light source. For example, it is known from DE 10 2008 005 488 A1 that a transparent, microstructured thin plate is provided between the light sources arranged in a common lighting level and an optic unit provided in the light path in front of the light sources. Using this plate the partial light beams of the individual light sources are widened. By the widening of the individual partial light beam a homogenous light distribution can develop, at least largely free from lighting spots. For this purpose, the transparent plate comprises a grooved and/or corrugated surface, for example. Although the use of the transparent plate has generally proven to be valuable, an individual widening of individual partial light beams can only occur to a limited extend when using a single common plate.

Another option to form individual partial light beams near the light sources is known from DE 10 2008 013 603 A1, DE 10 2008 044 967 A1, and DE 10 2009 053 581 B3. Here, an optic unit with a plurality of individual optic elements, arranged like a matrix, is provided near the light sources, with one optic element each being precisely allocated to one single light source. Accordingly, the partial light beam emitted by the individual light source is essentially formed only in the optic element allocated to the light source. The individual optic elements comprise a cross section widening over the course of the beam, for example a contour like a frustum and/or truncated pyramid. Accordingly they are expensive in their production. Furthermore, the optic elements to form the light are not or only insufficiently suitable for widening a partial light beam and for realizing a homogenous light distribution due to their design.

SUMMARY OF THE INVENTION

The objective of the present invention is therefore to provide an optic unit to widen partial light beams of a plurality of light sources showing high efficiency as well as enabling precise separation of the individually addressed light sources and here is easy in its production and provides a homogenous light distribution.

In order to attain the objective the invention in connection with the preamble of claim 1 is characterized in that the additional optic unit is embodied as a widening optic unit with a plurality of band deflector elements arranged as intersecting band reflective elements to form polygonal reflectors as optic elements and showing a plurality of light forming elements arranged corresponding to the light source like a matrix and arranged between the light sources and the polygonal reflectors.

The particular advantage of the invention comprises that the effectiveness of the additional optic unit is improved by providing light forming elements. The light forming elements deflect at least some of the light emitted by the light sources in the direction of the polygonal reflectors with the consequence that the portion of the diffused light is reduced and the angle is reduced by which the light impinges the band reflector segments. By reducing the angle the light is less frequently reflected in the polygonal reflectors so that the optic loss is reduced.

The core of the invention is therefore to provide additional light forming elements, particularly lenses and/or reflectors in addition to the polygonal reflectors formed from the band reflector segments. Here, lenses and reflectors with defined optic features can also be produced in small structures cost-effectively and in large numbers.

According to a preferred embodiment of the invention the polygonal reflectors are embodied as triangular reflectors and/or as rectangular reflectors. Advantageously the triangular reflectors and rectangular reflectors can be realized in a particularly simple fashion. Additionally triangular and rectangular reflectors are particularly well suited to fulfill the statutory specifications for controlled and dynamic light distribution. Here, rectangular and rhomboid reflectors are particularly advantageous among the tetrahedral reflectors, with the production and assembly being further simplified.

For example, the polygonal reflectors can be embodied as regular polygonal reflectors with evenly arranged band reflector segments aligned perpendicular in reference to the light generation level of the light source. Advantageously the features of the virtual light source with regard to lighting technology can be predetermined and adjusted particularly precisely by the even arrangement and rectangular orientation of the band reflector segments in reference to the light generation level. Simultaneously the homogeneity of the light distribution is further improved when due to a constant cross-sectional area the polygonal reflectors are lit in even parts of the light distribution per partial light beam.

According to a further development of the invention the light forming elements are connected to each other to form a matting arrangement. Advantageously the light forming element connected to form a matting can be handled, particularly assembled and aligned, in a particularly simple fashion. The matting arrangement may show positioning marks or the like, which simplify the alignment of the matting device as a whole in reference to the light sources and/or to the rectangular reflectors.

According to a further development of the invention a blind is provided between adjacent light forming elements, at least sectionally. By providing such a blind between adjacent light forming elements, particularly lenses, the portion of the falsely deflected light can be reduced, which is deflected from a light source for example via multiple reflections into a rectangular reflector allocated to an adjacent light source. This way, the separation of the light beams in the separately addressed segments of the light distribution and any blinding in the sections shut-off is avoided.

According to a further development of the invention an insert with recesses made from a light-impermeable material is surrounded at least sectionally by a transparent material to realize a matting arrangement with blinds. Lenses as light forming elements are formed from the transparent material in the area of the recesses. Here, advantageously a matting arrangement of lenses is created as light forming elements with integrated blinds. When a suitable material is selected the matting arrangement can be embodied particularly stable mechanically by the integrated blind and/or show thermally advantageous features. In particular the insert (the blind) is formed from a material with a low thermal expansion coefficient with the consequence that the matting arrangement deforms to a low extent under changing temperature stress.

According to a further development of the invention at least some of the band reflector segments show a free reflector edge embodied in a cut fashion at a side facing away from the light sources. By the cutting process of the free reflector edge a portion of the partial light beam widened in the rectangular reflector transfers into the neighboring reflector. This way a further homogenization of the light distribution results in this area.

According to a further development of the invention at least some band reflector segments can be arranged inclined in reference to a perpendicular to the light generation level. Advantageously a widening of the light distribution, particularly a wider vertical angular range, can be realized by a diagonal alignment of the band reflector segment. This way particularly in the high-beam range a vertical extension of the lit area develops.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 A perspective view of a widening optic unit in a first embodiment,

FIG. 2 a top view of a widening optic unit according to FIG. 1,

FIG. 3 a cross section of the widening optic unit according to the section A-A according to FIG. 2, FIG. 4 a lighting device with a light forming optic unit, light sources, and the widening optic unit according to FIG. 1 with an illustration of the light path for a light source.

FIG. 5 an alternative embodiment of the widening optic unit with an integrated blind, FIG. 6 a third embodiment of a widening optic unit, FIG. 7 a lighting device with a fourth embodiment of the widening optic unit, and FIG. 8 a fifth embodiment of the widening optic unit.

DETAILED DESCRIPTION

Figure 7:
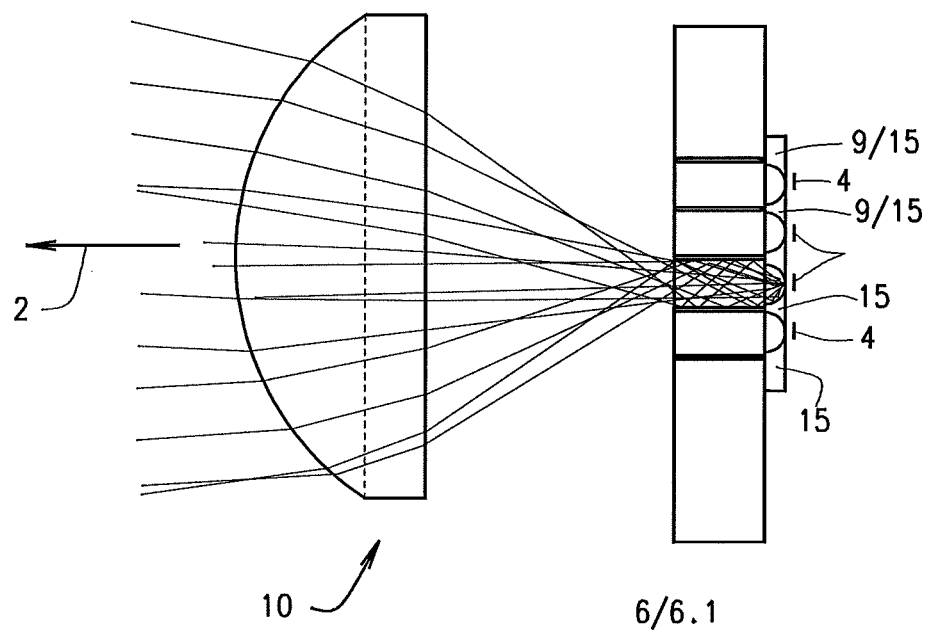

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

A widening optic unit 1 according to FIGS. 1 through 3 is arranged in a primary direction of light emission 2 of a lighting device in front of a plurality of light sources 4 arranged at a distance from each other like a matrix in the light generation level 3. The widening optic unit 1 comprises a plurality of polygonal reflectors 5, for example embodied as rectangular reflectors 5. The rectangular reflectors 5 are formed from intersecting (crossing) arranged band reflector segments 6. A first part 6.1 of the band reflector segments 6 is also evenly distanced and aligned parallel in reference to each other and comprises optically effective reflector areas 7 aligned perpendicular in reference to the light generation level 3. A second part 6.2 of the band reflector segment 6 is also distanced evenly and arranged at a 90° angle in reference to the first part 6.1 of the band reflector segments 6. Here, too, the lateral surfaces 7 are provided perpendicular in reference to the light generation level 3. Lenses 8 are arranged as light generating elements between the rectangular reflectors 5 and the light sources 4. The lenses 8 are aligned like a matrix, similar to the light sources 4 and the rectangular reflectors 5. A lens 8 is precisely allocated here to a light source 4 and a rectangular reflector 5 such that a partial light beam emitted by the light source 4 is formed in the lens 8 and emitted in the direction of the rectangular reflector 5.

The lenses 8 are connected to each other and form a matting arrangement 9. The matting arrangement 9 comprises a planar structure and essentially extends in the light generation level 3. In the present exemplary embodiment the matting arrangement 9 serves simultaneously as a carrier for the band reflector segment 6.

FIG. 4 shows a widening optic unit 1 in a lighting device. The lighting device comprises a light forming optic unit 10, for example comprising a single lens. The widening optic unit 1 is arranged between the light forming optic unit 10 and the light sources 4. Here, the widening optic unit 1 is directly allocated to the light sources 4 and arranged distanced from the light forming optic unit 10. The partial light beam emitted by the light sources 4 is formed in the allocated lens 8 and emitted in the direction of the allocated rectangular reflector 5. In the rectangular reflector 5 the light is reflected at the lateral surfaces 7 and widened such that the light emitted from the widening optic unit 1 is homogeneously distributed. Light spots (light gaps), which would be discernible due to the distance of the light sources when the widening optic unit 1 is omitted in the light distribution and can be recognized as disturbing, are avoided or significantly reduced as a consequence of widening the partial light beam.

A second embodiment of the widening optic unit 1 according to FIG. 5 comprises blinds 11 arranged in the area of the matting arrangement 9. The blinds 11 are arranged such that particularly light emitted laterally from the light sources 4 impinges the blinds 11 and consequently cannot impinge any neighboring lens 8 and/or a neighboring rectangular reflector 5. By the blinds 11 accordingly a reduction of the diffused light results.

The blinds 11 are realized in the form of an insert 12 and are connected to each other in one part. The insert 12 comprises a number of recesses 13. The lenses 8 of the widening optic unit 1 are formed in the area of the recesses 13. The insert 12 is coated with a transparent plastic by way of injection molding, for example, in order to form the matting arrangement 9. Here, the lenses 8 are formed in the area of the recesses 13. The insert 12 is produced for example from a material with a low thermal expansion coefficient. Due to the low thermal expansion coefficient the insert 12 deforms only slightly and thus also the matting arrangement 9 under alternating thermal stress. The insert 12 can provide additional mechanic stability to the matting arrangement 9. This particularly applies if it is coated by injection molding with an elastic transparent material, for example silicon, to form the lenses 8.

A third embodiment of the widening optic unit 1 according to FIG. 6 provides band reflector segments 6, extending to [areas] between adjacent lenses 8. An edge section 14 facing the light sources 4 of the reflective segments 6 acts therefore as a blind 11 and prevents light laterally emitted by the light sources 4 from reaching adjacent lenses 8 and/or adjacent rectangular reflectors 5.

Another embodiment according to the invention with a widening optic unit 1 according to a fourth embodiment according to FIG. 7 shows reflectors 15 as light forming elements instead of lenses 8. The reflectors 15 are provided instead of the lenses 8 between the rectangular reflectors 5 and the light sources 4. By the reflectors 15 any light emitted by the light sources 4 is deflected in the direction of the rectangular reflectors 5. Inherently, the reflectors 15 embodied non-transparent act as blinds 11 preventing any transfer of light into adjacent rectangular reflectors 5.

Figure 8:
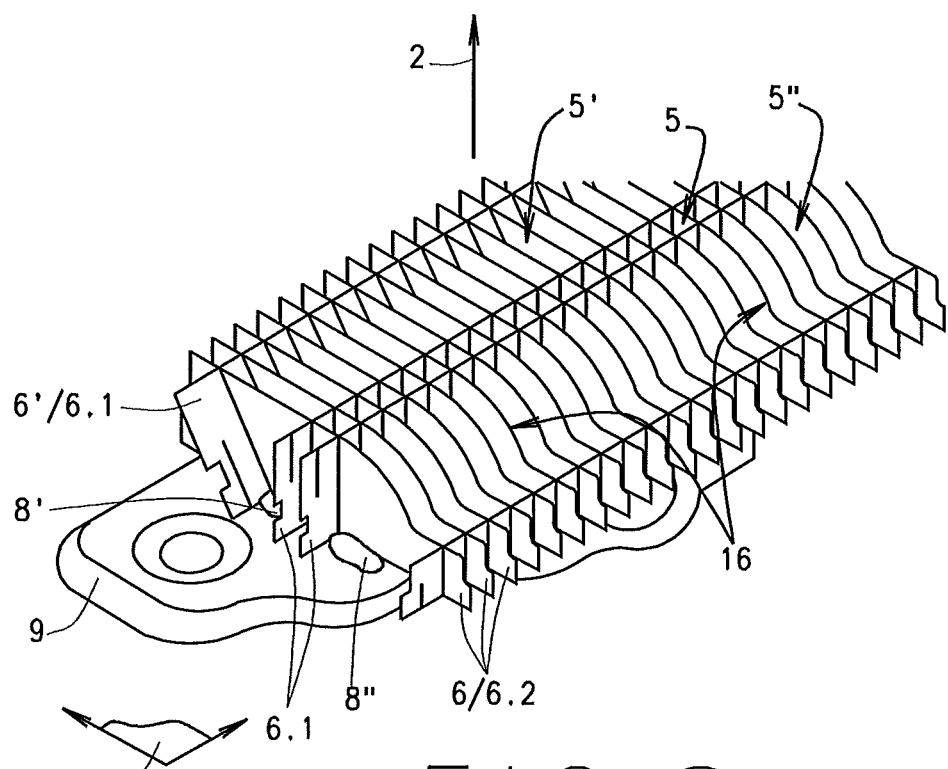

A fifth embodiment of the widening optic unit 1 according to FIG. 8 comprises no regularly arranged band reflector segments 6.1 but intersecting arranged band reflector segments 6.2, which are embodied beveled in the area of the free reflector edge 16 facing away from the light sources 4. An exterior band reflector segment 6' of the first part 6.1 of the band reflector segments 6 is inclined in reference to a perpendicular embodied on the light generation level 3 so that a rectangular reflector 5' forms with an expanded cross section. By the inclined position of the exterior band reflector segment 6.1' for example in the high-beam range the lighting is possible over a wider vertical angular range. The lit area is enlarged by the vertical extension of the light distribution. Optionally, a modified embodied, particularly asymmetrical lens 8' may be allocated to the rectangular reflector 5' formed by the inclined band reflector segment 6.1'.

Thus, rectangular reflectors 5" embodied in the area of the beveled reflector edge 16 also show a lens 8" in a modified geometry. By a beveled free reflector edge 16 the edge of the reflector chamber 8" can be pushed out of the precisely defined area of the light forming optic unit 10. In the beveled section a portion of the light reaches the neighboring segment. This way a homogenization of the light distribution develops in this area.

The lenses 8, 8', 8" may show light coupling areas and/or light decoupling areas switched as free forming areas. In particular, a flat side of the lens array (matting arrangement 9) may be embodied planar (flat). Although in the exemplary embodiments shown the flat side facing the light sources 4 of the matting arrangement 9 is embodied planar, here the flat side facing the rectangular reflectors 5, 5', 5" may be embodied planar as well.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

LIST OF REFERENCE CHARACTERS

1 Widening optic unit
2 Primary direction of emission
3 Light generation level
4 Light source
5, 5', 5" Rectangular reflectors
6 Band reflector segments
6.1 First part of the band reflector segments
6.2 Second part of the band reflector segments
6' Inclined band reflector segment
7 Lateral side
8, 8', 8" Lens
9 Matting arrangement
10 Light forming optic unit
11 Blind
12 Insert
13 Recess
14 Edge section
15 Reflector
16 Free reflector edge

The invention claimed is:

1. A lighting device for vehicles with a plurality of light sources arranged like a matrix in a light generation level, with a light forming optic unit arranged in front of the light sources in a primary direction of emission, and with another optic unit arranged between the light forming optic unit and the light sources, comprising a plurality of optic elements, with the optic elements being arranged like a matrix and one optic element each being allocated to a light source, wherein the additional optic unit is embodied as a widening optic unit with a plurality of band reflector segments arranged intersecting to form polygonal reflectors as optic elements and with a plurality of light forming elements, which are arranged like a matrix corresponding to the light sources and arranged between the light sources and the polygonal reflectors.

2. The lighting device according to claim 1, wherein the light forming elements are lenses or reflectors are provided as light forming elements.

3. The lighting device according to claim 1, wherein the light forming elements are connected to each other to form a matting arrangement.

4. The lighting device according to claim 1, wherein the polygonal reflectors are selected from the group consisting of triangular reflectors, tetragon reflectors, rectangular reflectors, and rhomboid reflectors.

5. The lighting device according to claim 1, wherein at least sectionally a blind is provided between adjacent light forming elements.

6. The lighting device according to claim 1, further comprising an insert with recesses comprising a material impermeable for light at least sectionally surrounded by a transparent material in order to realize a matting arrangement with blinds, with lenses made form a transparent material being formed as the light forming elements in the area of the recesses.

7. The lighting device according to claim 1, wherein the band reflectors extend between the light forming elements to realize a blind.

8. The lighting device according to claim 1, wherein the band reflectors extend between the light forming elements to realize the blind.

9. The lighting device according to claim 1, wherein at least some band reflector elements show a free reflector edge by way of cutting, at the side facing away from the light sources, to improve the homogeneity of the light distribution.

10. The lighting device according to claim 1, wherein at least individual band reflector segments are arranged inclined in reference to a perpendicular line on the light generation level.

11. The lighting device according to claim 1, wherein the polygonal reflectors are formed as band reflector segments aligned perpendicular in reference to the light generation level of the light sources.

* * * * *